(12) United States Patent
Porras et al.

(10) Patent No.: US 10,458,377 B2
(45) Date of Patent: Oct. 29, 2019

(54) FUEL PRESSURE REGULATOR

(71) Applicant: DELPHI TECHNOLOGIES IP LIMITED, St. Michael (BB)

(72) Inventors: Luis M. Porras, Chihuahua (MX); Salvador Sanchez, Chihuahua (MX)

(73) Assignee: DELPHI TECHNOLOGIES IP LIMITED (BB)

(*) Notice: Subject to any disclaimer, the term of this patent is extended or adjusted under 35 U.S.C. 154(b) by 10 days.

(21) Appl. No.: 15/724,619

(22) Filed: Oct. 4, 2017

(65) Prior Publication Data

US 2019/0101085 A1    Apr. 4, 2019

(51) Int. Cl.
    *F02M 37/00*      (2006.01)
    *B60K 15/03*      (2006.01)

(52) U.S. Cl.
    CPC ......... *F02M 37/0052* (2013.01); *B60K 15/03* (2013.01); *F02M 37/0029* (2013.01); *B60K 2015/03296* (2013.01)

(58) Field of Classification Search
    CPC ........... F02M 37/0052; F02M 37/0029; B60K 2015/03296; B60K 2015/03; F16K 15/048
    USPC .................................................. 137/535, 538
    See application file for complete search history.

(56) References Cited

U.S. PATENT DOCUMENTS

| 5,842,455 | A | 12/1998 | Tuckey et al. | |
| 2004/0250795 | A1 | 12/2004 | Stroia et al. | |
| 2007/0107784 | A1* | 5/2007 | Hoffman | F16K 15/063 137/538 |
| 2011/0251776 | A1 | 10/2011 | Bartell et al. | |
| 2013/0340890 | A1* | 12/2013 | Matsuo | F02M 37/0029 141/198 |

* cited by examiner

*Primary Examiner* — P. Macade Nichols
(74) *Attorney, Agent, or Firm* — Joshua M. Haines

(57) ABSTRACT

A fuel pressure regulator includes a housing having a housing bore and a housing inlet; a piston located within the housing bore such that the piston and the housing bore define an accumulation chamber and such that the piston moves between a first piston position where the accumulation chamber is minimized in volume and a second piston position where the accumulation chamber is maximized in volume, the piston having a piston bore with a piston inlet and a piston outlet and a valve seat defined therebetween; a piston spring which biases the piston toward the first piston position; a valve closure which moves between a seated position which prevents fluid communication from the piston inlet to the piston outlet and an unseated position which provides fluid communication from the piston inlet to the piston outlet; and a valve closure spring which biases the valve closure toward the seated position.

13 Claims, 4 Drawing Sheets

FUEL PRESSURE REGULATOR

TECHNICAL FIELD OF INVENTION

The present invention relates to a fuel pressure regulator and even more particularly to a fuel pressure regulator which includes an accumulation chamber.

BACKGROUND OF INVENTION

Internal combustion engines which utilize liquid fuel are well known, for example, to provide propulsion in motor vehicles. Fuel systems for delivering liquid fuel to the internal combustion engine are also well known. Such fuel systems typically include a fuel tank which holds a volume of fuel, one or more fuel pumps for pumping fuel from the fuel tank to the internal combustion engine and one or more fuel injectors for delivering a precisely metered amount of fuel to be combusted in one or more combustion chambers of the internal combustion engine. In one known fuel system described in United States Patent Application Publication No. US 2004/0250795 A1, the fuel system also includes a fuel pressure regulator, described therein as a pump pressure relief valve, and also includes a fuel accumulator, both of which are illustrated within the fuel tank only schematically. Also as illustrated therein, the fuel pressure regulator and the fuel accumulator are distinct elements, which increase the packaging size of the two elements and also increases cost and complexity to produce the system.

What is needed is a fuel pressure regulator which minimizes or eliminates one or more of the shortcomings set forth above.

SUMMARY OF THE INVENTION

Briefly described, a fuel pressure regulator in accordance with the present invention is provided for regulating fuel pressure in a fuel system. The fuel pressure regulator includes a housing having a housing bore which extends along a housing bore axis, the housing also having a housing inlet which allows fuel into the housing bore; a piston located within the housing bore such that the piston and the housing bore define an accumulation chamber and such that the piston slides along the housing bore axis between 1) a first piston position in which the accumulation chamber is minimized in volume and 2) a second piston position in which the accumulation chamber is maximized in volume, the piston having a piston bore extending therethrough from a piston inlet to a piston outlet such that a valve seat is defined between the piston inlet and the piston outlet, such that the piston inlet allows fuel into the piston bore from the housing inlet, and such that the piston outlet provides a path out of the fuel pressure regulator from the piston bore; a piston spring which biases the piston toward the first piston position; a valve closure within the piston bore which moves between 1) a seated position such that the valve closure mates with the valve seat, thereby preventing fluid communication from the piston inlet to the piston outlet and 2) an unseated position such that the valve closure is separated from the valve seat, thereby providing fluid communication from the piston inlet to the piston outlet; and a valve closure spring which biases the valve closure toward the seated position.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
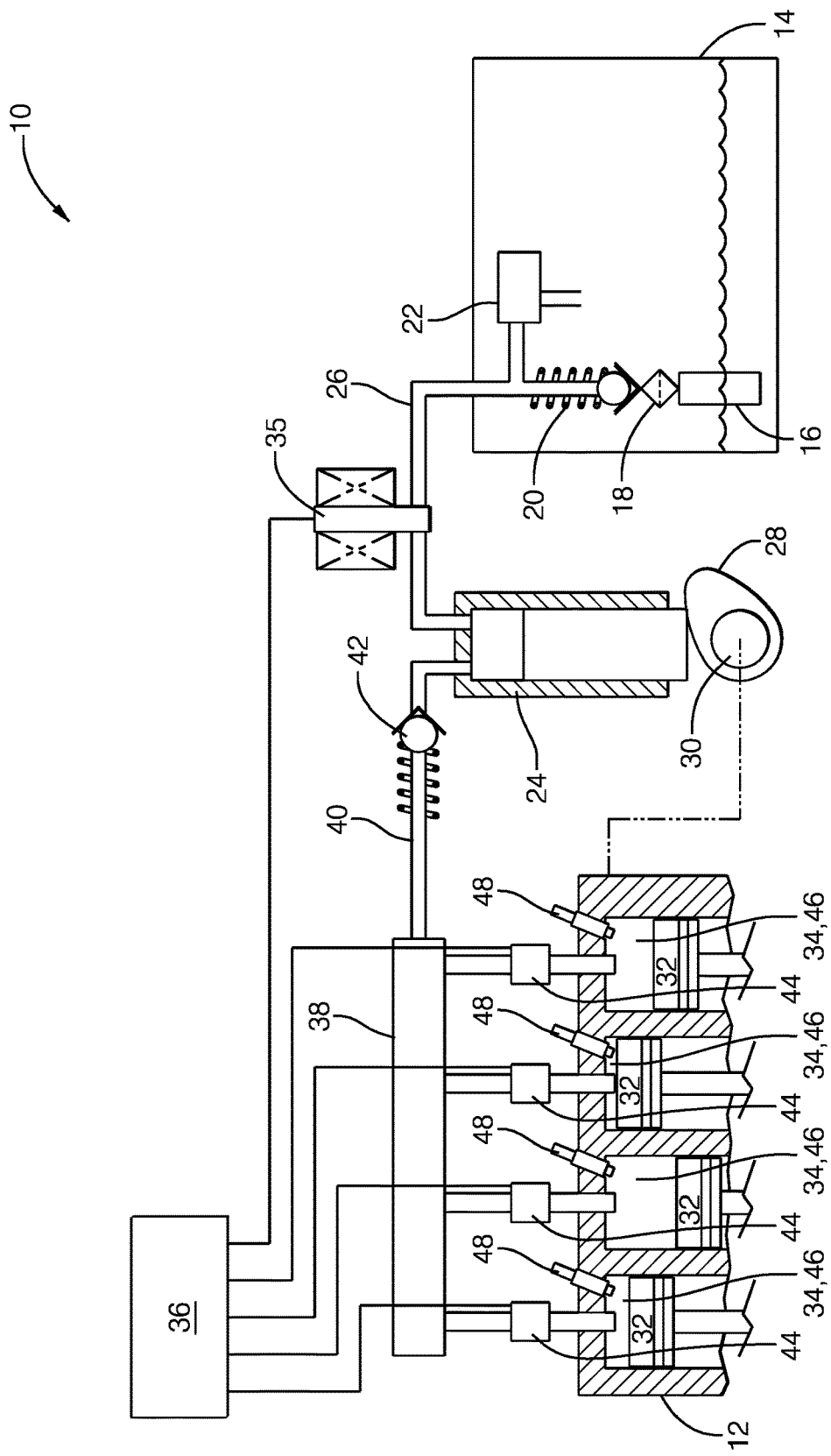
FIG. 1 is a schematic view of a fuel system including a fuel pressure regulator in accordance with the present invention.

In accordance with a preferred embodiment of this invention and referring initially to FIG. 1, a fuel system 10 is shown for providing liquid fuel to an internal combustion engine 12. Fuel system 10 includes a fuel tank 14 for storing liquid fuel which is used to fuel internal combustion engine 12. The liquid fuel stored in fuel tank 14 may be gasoline, ethanol, a blend of gasoline and ethanol, diesel fuel, or any other liquid fuel that may be used to fuel internal combustion engine 12. A low pressure fuel pump 16 is disposed inside fuel tank 14 in order to convey liquid fuel out of fuel tank 14. Low pressure fuel pump 16 is typically capable of supplying liquid fuel at a pressure in the range of 400 kPa to 600 kPa with a typical desired pressure being 500 kPa. A fuel filter 18 may also be disposed inside fuel tank 14 on the output side of low pressure fuel pump 16 in order to filter contaminants out of the liquid fuel before the liquid fuel is conveyed to other components in fuel system 10. A check valve 20 may also be disposed inside fuel tank 14 on the output side of low pressure fuel pump 16 and downstream of fuel filter 18 in order to prevent backflow of fuel into low pressure fuel pump 16. A fuel pressure regulator 22 is disposed on the output side of low pressure fuel pump 16 and downstream of check valve 20 in order to regulate the pressure of the liquid fuel that is being conveyed out of fuel tank 14 to a predetermined pressure. As illustrated in FIG. 1, by way of non-limiting example only, fuel pressure regulator 22 may be located inside fuel tank 14, however, it should be understood that fuel pressure regulator 22 may alternatively be located outside of fuel tank 14. Fuel pressure regulator 22 typically regulates fuel to a pressure in the range of 400 kPa to 600 KPa with a typical desired pressure being 500 kPA. Fuel pressure regulator 22 will open in proportion to the fuel pressure in a low pressure fuel line 26 allowing excess liquid fuel back to fuel tank 14, thereby maintaining the pressure of the liquid fuel exiting check valve 20 close to the predetermined value. While low pressure fuel pump 16, fuel filter 18, check valve 20, and fuel pressure regulator 22 have been described and shown as being disposed inside fuel tank 14 in a particular order, one of ordinary skill in the art of fuel systems will now recognize that one or more of these elements may be disposed outside of fuel tank 14 and may similarly be placed in a different order.

Liquid fuel is conveyed out of fuel tank 14 by low pressure fuel pump 16 to a high pressure fuel pump 24 through low pressure fuel line 26. High pressure fuel pump 24 may be a piston type pump that is driven by a cam lobe 28 of a camshaft 30 of internal combustion engine 12. In a piston type pump, engine pistons 32 are reciprocated in respective cylinder bores 34. The stroke of engine pistons 32 in cylinder bores 34 pressurizes the liquid fuel. High pressure fuel pumps are typically capable of supplying liquid fuel at a pressure in the range of 3 MPa to 26 MPa with typical desired pressures being between 5 MPa and 20 MPa which is determined by a fuel system controller 36 based on fuel pressure needs of internal combustion engine 12. A control valve 35 is disposed in low pressure fuel line 26 to selectively permit and prevent fluid communication between low pressure fuel line 26 and high pressure fuel pump 24. Control valve 35 may be controlled by a fuel system controller 36 to allow low pressure liquid fuel to be admitted to high pressure fuel pump 24 from low pressure fuel line 26 after high pressure fuel pump 24 has discharged a high pressure charge of liquid fuel to internal combustion engine 12. Likewise, control valve 35 may also be controlled by fuel system controller 36 to prevent fluid communication between low pressure fuel line 26 and high pressure fuel pump 24 after a low pressure charge of liquid fuel has been supplied to high pressure fuel pump 24 and is ready to be pressurized to high pressure by high pressure fuel pump 24.

Control valve 35 and fuel system controller 36 also control the pressure of liquid fuel output by high pressure fuel pump 24 by limiting the quantity of liquid fuel admitted into high pressure fuel line 40 from high pressure fuel pump 24. In order to do this, fuel system controller 36 determines the amount of liquid fuel that will be required by internal combustion engine 12 and also determines what portion of the stroke of high pressure fuel pump 24 is needed to meet the fuel requirement. Control valve 35 is commanded open by fuel system controller 36 when the determined portion of the stroke of high pressure fuel pump 24 has been completed, thus allowing the remainder of the high pressure charge to be supplied back to into low pressure fuel line 26. High pressure fuel pumps and piston type pumps are well known to those skilled in the art of direct injection engine fuel systems and will not be discussed further herein.

Liquid fuel is conveyed to a fuel rail 38 from high pressure fuel pump 24 through a high pressure fuel line 40. A high pressure check valve 42 may be disposed in high pressure fuel line 40 to prevent backflow of liquid fuel into high pressure fuel pump 24. One or more fuel injectors 44 are fluidly connected to fuel rail 38 in know fashion for receiving liquid fuel therefrom and for injecting liquid fuel into one or more corresponding combustion chambers 46 of internal combustion engine 12 where combustion of the liquid fuel may be commenced by spark plugs 48. Alternatively, spark plugs 48 may be omitted and combustion may be commenced through compression ignition.

Now referring to FIGS. 2-4, fuel pressure regulator 22 will be described in greater detail. Fuel pressure regulator 22 generally includes a housing 50, a piston 52, a piston spring 54, a valve closure 56, and a valve closure spring 58. The individual components of fuel pressure regulator 22 and their interrelationship will be described in greater detail in the paragraphs that follow.

Housing 50 includes a housing bore 60 extending therethrough such that housing bore 60 extends along, and is centered about, a housing bore axis 62. As shown, the cross-sectional shape of housing bore 60 may be a circle when sectioned by a plane that is perpendicular to housing bore axis 62. Also as shown, housing bore 60 may be stepped to include a housing bore first portion 60a which itself may be stepped and which defines a housing inlet 60b, a housing bore second portion 60c adjacent to housing bore first portion 60a such that housing bore second portion 60c is larger in diameter than housing bore first portion 60a, and a housing bore third portion 60d adjacent to housing bore second portion 60c such that housing bore second portion 60c is located axially between housing bore first portion 60a and housing bore third portion 60d and such that housing bore third portion 60d is larger in diameter than housing bore second portion 60c. Housing inlet 60b is in fluid communication with low pressure fuel line 26, thereby allowing fuel to flow from low pressure fuel line 26 into housing bore 60, however, also allowing fuel to flow from housing bore 60 into low pressure fuel line 26 as will be described in greater detail later. Housing bore third portion 60d defines a housing outlet 60e which returns excess fuel to fuel tank 14 as will be described in greater detail later. Due to the stepped nature of housing bore 60, a housing bore first shoulder 60f is defined which is a surface joining housing bore first portion 60a to housing bore second portion 60c such that housing bore first shoulder 60f may be substantially perpendicular to housing bore axis 62. Also due to the stepped nature of housing bore 60, a housing bore second shoulder 60g is defined which is a surface joining housing bore second portion 60c to housing bore third portion 60d. Housing bore third portion 60d may include protrusions 60h which extend radially inward into housing bore 60 such that each protrusion 60h defines a surface 60i which faces toward housing bore second shoulder 60g. One or more protrusions 60h act as a spring seat which grounds piston spring 54 to housing 50 and retains piston spring 54 within housing bore 60. Housing 50 may be made of a metallic material, by way of non-limiting example only, stainless steel which may be machined to shape from bar stock or stamped or drawn to shape from a sheet of material. Alternatively, housing 50 may be a plastic material that may be, by way of non-limiting example only, net-formed in an injection molding process. Housing 50 may be integrated with other elements of fuel system 10, for example a fuel module which includes low pressure fuel pump 16, or fuel filter 18. Furthermore, if fuel pressure regulator 22 is located outside of fuel tank 14, a return line (not shown) may provide fluid communication from housing outlet 60e to the interior of fuel tank 14.

Piston 52 is located within housing bore 60 and includes a piston bore 64 extending therethrough such that piston bore 64 extends along, and is centered about, housing bore axis 62. As shown, the cross-sectional shape of piston 52 may be an annulus when sectioned by a plane that is perpendicular to housing bore axis 62. The outer peripheral surface of piston 52 which faces radially toward the wall of housing bore 60 may be stepped, thereby defining a piston first portion 52a and a piston second portion 52b which is larger in diameter than piston first portion 52a such that a piston shoulder 52c is defined which is a surface joining piston first portion 52a to piston second portion 52b. Piston shoulder 52c may be substantially perpendicular to housing bore axis 62 as shown. Piston first portion 52a is located primarily within housing bore second portion 60c, however, as shown in FIG. 2, the tip of piston first portion 52a may extend into housing bore first portion 60a where piston first portion 52a is sized to provide radial clearance with housing bore first portion 60a so as to maintain fluid communication therebetween from housing inlet 60b to housing bore second portion 60c. Piston first portion 52a is also sized to provide a clearance with housing bore second portion 60c such that an accumulation chamber 66 is defined radially between piston first portion 52a and housing bore second portion 60c and axially between piston shoulder 52c and housing bore first shoulder 60f. Piston 52 slides along housing bore axis 62 between 1) a first piston position as shown in FIG. 2 in which accumulation chamber 66 is minimized in volume and 2) a second piston position as shown in FIGS. 3 and 4 in which accumulation chamber 66 is maximized in volume. Piston second portion 52b is located within housing bore second portion 60c and housing bore third portion 60d such that piston second portion 52b may be sized to be a close sliding fit with housing bore second portion 60c whereby the close sliding fit allows piston 52 to freely slide axially within housing bore 60 while substantially preventing radial movement of piston 52 within housing bore 60, i.e. in a direction perpendicular to housing bore axis 62. Piston second portion 52b includes a seal groove 52d which extends radially into the periphery of piston second portion 52b such that seal groove 52d is annular and is centered about housing bore axis 62. Seal groove 52d receives a sealing ring 68 therewithin which sealingly mates radially inward with seal groove 52d and sealingly mates radially outward with housing bore second portion 60c in order to seal the outer peripheral surface of piston 52 to the inner peripheral surface of housing bore 60, thereby preventing fuel from passing out of fuel pressure regulator 22 radially between the housing bore inner peripheral surface and the piston outer peripheral surface. As shown, sealing ring 68 may be a single element and may be made of PTFE, by way of non-limiting example only; however, other materials are well known to those of skill in the art. Alternatively sealing ring 68 may be a plurality of rings stacked radially such that an inner sealing ring may be an O-ring made of a rubber-based material and such that an outer sealing ring may radially surround the rubber-based O-ring and may be made of PTFE. Piston 52 also includes a piston flange 52e which extends radially outward from piston second portion 52b such that piston flange 52e is located within housing bore third portion 60d. Consequently, piston flange 52e is annular in shape and centered about housing bore axis 62. Piston flange 52e is sized to be larger in diameter than housing bore second portion 60c, and consequently, piston flange 52e serves to limit the travel of piston 52 within housing bore 60 by abutting housing bore second shoulder 60g as shown in FIG. 2 and as will be described in greater detail later. Piston flange 52e also serves as a spring seat for piston spring 54 such that piston spring 54 is held in compression between one or more protrusions 60h and piston flange 52e such that piston spring 54 biases piston 52 toward the first position of piston 52 as shown in FIG. 2. As shown, the cross-sectional shape of piston bore 64 may be a circle when sectioned by a plane that is perpendicular to housing bore axis 62. Also as shown, piston bore 64 may be stepped to include a piston bore first portion 64a which defines a piston inlet 64b that is proximal to housing inlet 60b. Piston inlet 64b allows fuel into piston bore 64 from housing inlet 60b. Piston bore 64 also includes a piston bore second portion 64c which is larger in diameter than piston bore first portion 64a and which defines a piston outlet 64d which is proximal to housing outlet 60e. Piston outlet 64d allows fuel out of piston bore 64 and provides a path out of fuel pressure regulator 22 via housing outlet 60e. A valve seat 64e is defined by piston bore 64 in the transition from piston bore first portion 64a and piston bore second portion 64c. As shown, valve seat 64e may take the form of a spherical frustum, i.e. a spherical segment, which is complementary to valve closure 56 in order to provide positive sealing between valve closure 56 and valve seat 64e when valve closure 56 mates with valve seat 64e. While valve seat 64e has been illustrated as a spherical frustum, it should be understood that valve seat 64e may be any other shape which provides a positive seal when valve closure 56 mates with valve seat 64e.

Figure 2:
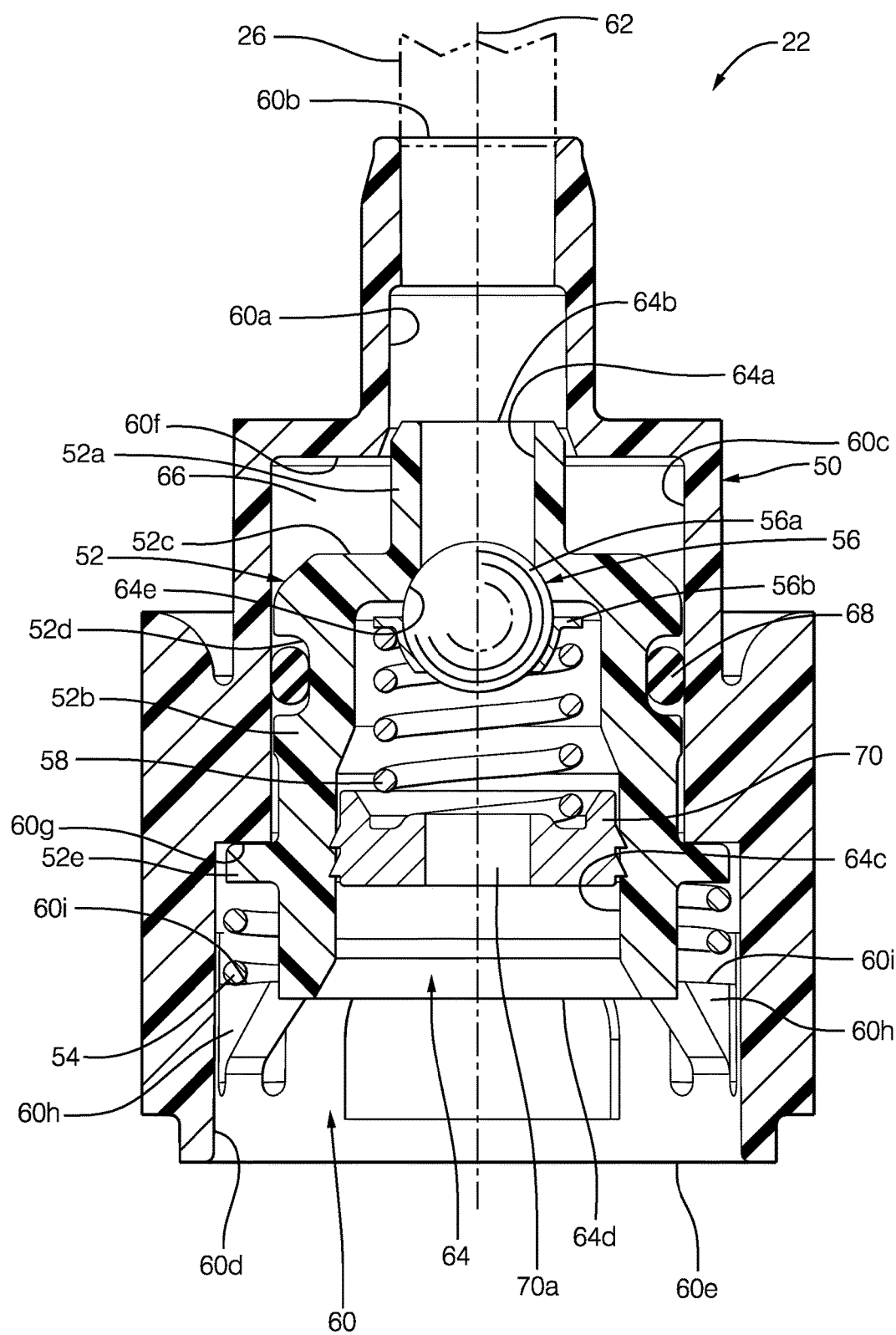
FIG. 2 is a cross-sectional view of the fuel pressure regulator in accordance with the present invention, showing the fuel pressure regulator in a first operating position.
Figure 3:
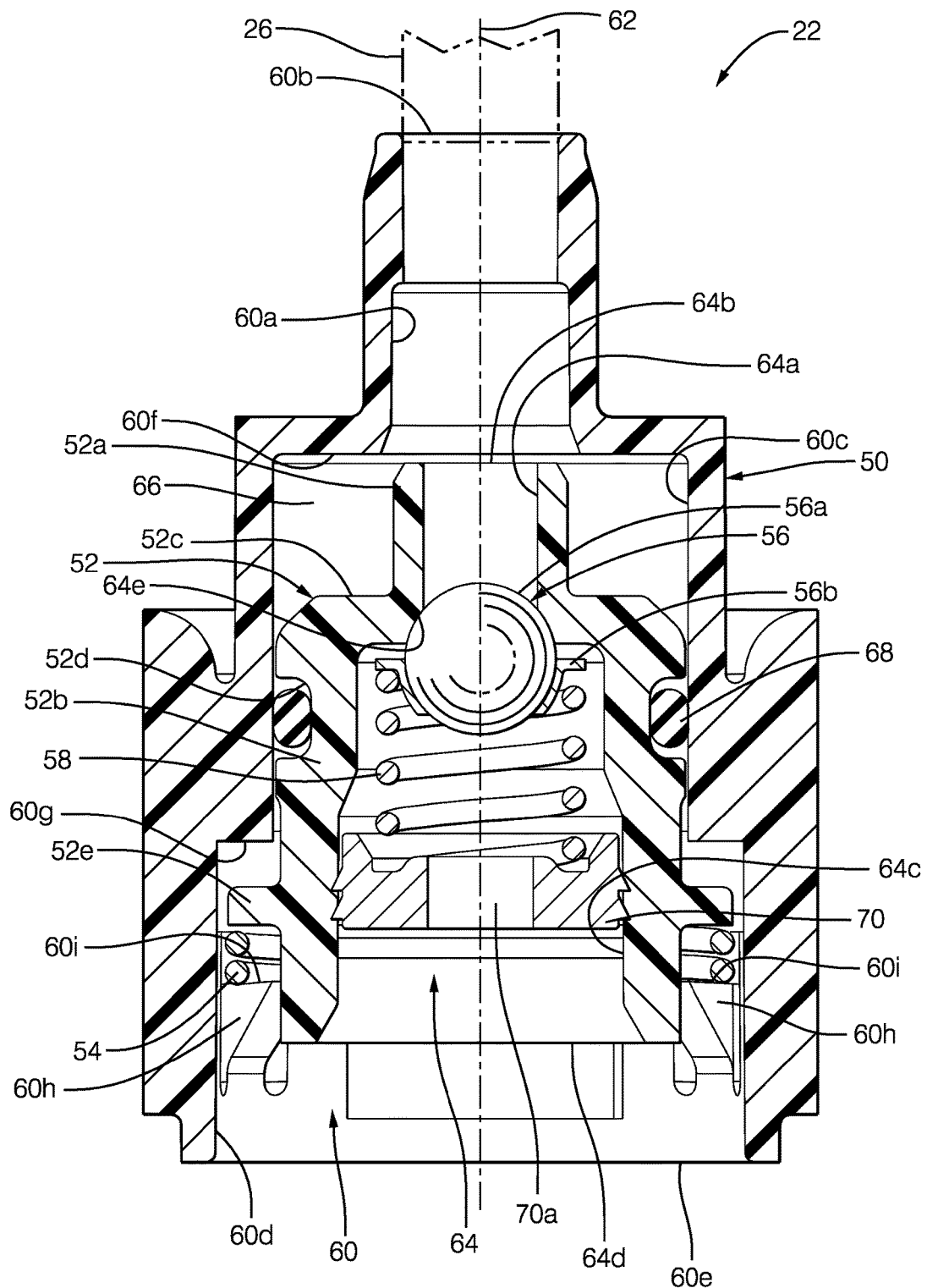
FIG. 3 is a cross-sectional view of the fuel pressure regulator in accordance with the present invention, showing the fuel pressure regulator in a second operating position.
Figure 4:
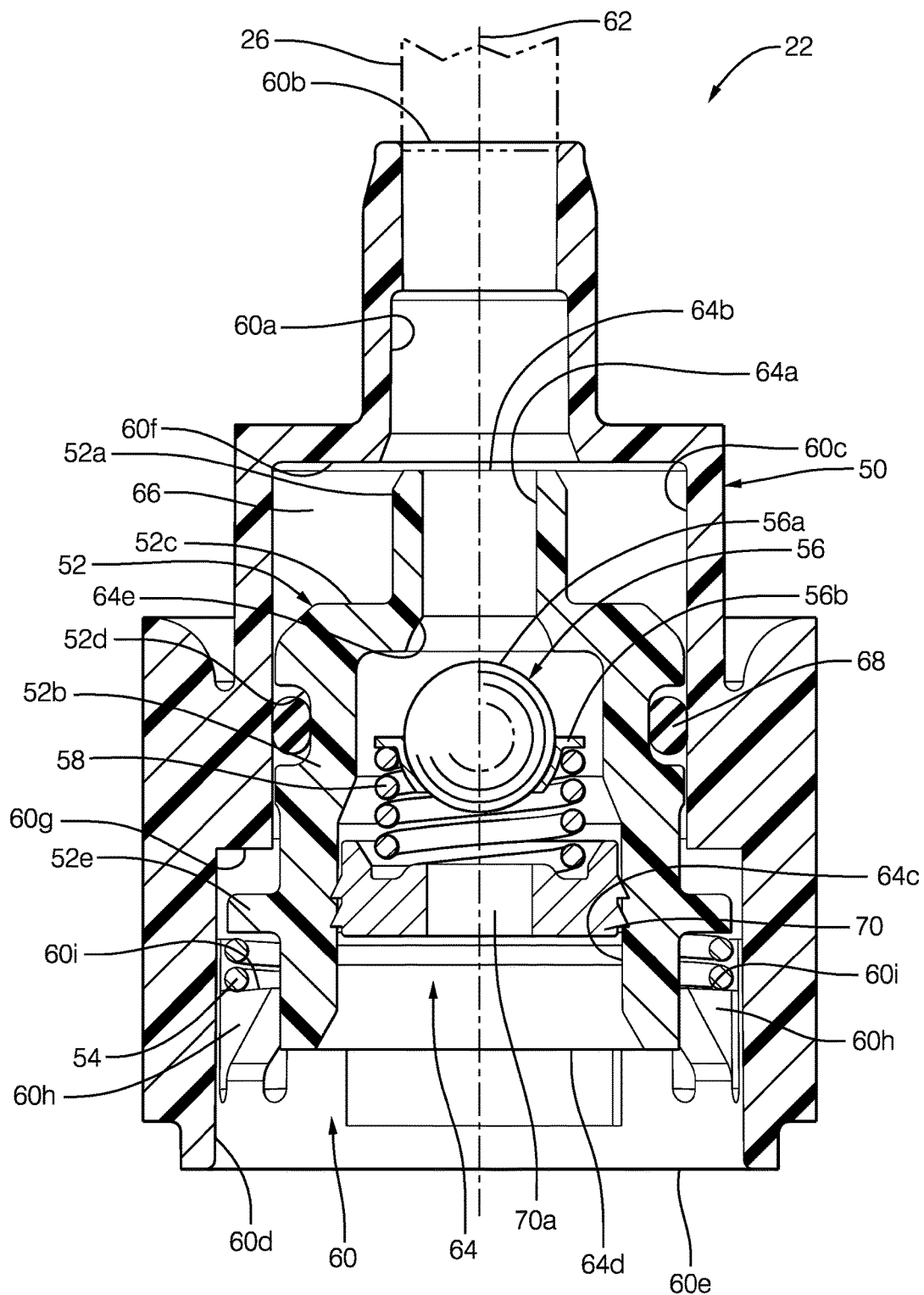
FIG. 4 is a cross-sectional view of the fuel pressure regulator in accordance with the present invention, showing the fuel pressure regulator in a third operating position.

Valve closure 56 is located within piston bore 64 and moves between 1) a seated position as shown in FIGS. 2 and 3 such that valve closure 56 mates with valve seat 64e, thereby preventing fluid communication from piston inlet 64b to piston outlet 64d and 2) an unseated position as shown in FIG. 4 such that valve closure 56 is separated from valve seat 64e, thereby providing fluid communication from piston inlet 64b to piston outlet 64d. As shown, valve closure 56 may include a ball 56a which is spherical and a ball holder 56b which is fixed to ball 56a and which acts as a spring seat for valve closure spring 58 which biases valve closure 56 toward the seated position as will be described in greater detail later. While valve closure 56 has been illustrated as including ball 56a which is spherical, it should be understood that other shapes for valve closure 56 are contemplated, by way of non-limiting example, frustoconical. Additionally, while valve closure 56 has been illustrated as including a second element, i.e. ball holder 56b, it should be understood that the features of ball 56a which selectively mate with valve seat 64e and the features of ball holder 56b which serve as a spring seat may alternatively be integrally formed as a single element. A valve closure spring retainer 70 is located within piston bore second portion 64c between valve closure 56 and piston outlet 64d. Valve closure spring retainer 70 is fixed to piston 52, by way of non-limiting example only, with an interference fit interface. Valve closure spring 58 is held in compression between valve closure spring retainer 70 and valve closure 56 such that valve closure spring retainer 70 grounds valve closure spring 58 to piston 52 and retains valve closure spring 58 within piston bore 64. Valve closure spring retainer 70 includes a passage 70a therethrough which provides fluid communication from valve seat 64e to piston outlet 64d. As shown, passage 70a may be centered about housing bore axis 62, however, may alternatively be located radially outward from housing bore axis 62 and may include a plurality of passages.

Operation of fuel pressure regulator 22 will now be described. When the fuel pressure within low pressure fuel line 26 drops below a predetermined value, piston spring 54 moves piston 52 from the second piston position of piston 52 shown in FIG. 3 toward the first piston position of piston 52 as shown in FIG. 2. This drop in pressure within low pressure fuel line 26 may be the result of, by way of non-limiting example only, the fuel cooling and contracting after operation of internal combustion engine 12 has ceased, a momentary high rate of fuel consumption of internal combustion engine 12, or periodic interrupted or low output of low pressure fuel pump 16. While piston 52 moves from the second piston position to the first piston position, fuel is pushed from accumulation chamber 66 and housing bore first portion 60a to low pressure fuel line 26 by piston spring 54 and piston 52, thereby maintaining pressure and uninterrupted flow of fuel to low pressure fuel line 26, thereby maintaining operation of high pressure fuel pump 24 and internal combustion engine 12. After the low-pressure condition within low pressure fuel line 26 has been resolved, fuel from low pressure fuel pump 16 causes piston 52 to move to the second piston position as shown in FIG. 3, thereby filling the maximized volume accumulation chamber 66 with fuel in order for piston 52 and accumulation chamber 66 to be prepared for the next low pressure condition within low pressure fuel line 26.

When piston 52 is in the second piston position as shown in FIG. 3, the output of low pressure fuel pump 16 may be in excess of the fuel pressure that is needed to support the operation of internal combustion engine 12. In order to prevent fuel pressure within low pressure fuel line 26 from exceeding a second predetermined pressure, thereby maintaining a consistent fuel pressure in low pressure fuel line 26, fuel acting on valve closure 56 causes valve closure spring 58 to compress, thereby causing valve closure 56 to unseat from valve seat 64e and move to the unseated position as shown in FIG. 4. As a result, the pressure within low pressure fuel line 26 is allowed to decrease and excess fuel exits fuel pressure regulator 22 through piston outlet 64d and housing outlet 60e and returns to the interior of fuel tank 14. After the pressure within low pressure fuel line 26 falls to the second predetermined pressure, valve closure spring 58 moves valve closure 56 to the seated position as shown in FIG. 2.

It should be noted that movement of piston 52 between the first piston position and the second piston position and that movement of valve closure 56 between the seated position and the unseated position is accomplished passively based on the pressure within low pressure fuel line 26 and the spring rates chosen for piston spring 54 and valve closure spring 58. Consequently, the spring rates of piston spring 54 and valve closure spring 58 can be selected to achieve the first predetermined pressure that is maintained by piston 52 and piston spring 54 and the second predetermined pressure to which the pressure within low pressure fuel line 26 is limited by valve closure 56 and valve closure spring 58. In this way, fuel pressure regulator 22 is able to function to both limit and maintain pressure within low pressure fuel line 26 in one simple and easy to manufacture device which occupies minimal packaging space, reduces the number of fuel connections, reduces the number of components, and is able to be accommodated within existing fuel modules.

While fuel pressure regulator 22 has been illustrated as being used in a fuel system for a high pressure direct injection configuration, it should be understood that fuel pressure regulator 22 may be equally applicable to a fuel system for a low pressure injection configuration, for example a fuel system used in port fuel injection.

While this invention has been described in terms of the preferred embodiments thereof, it is not intended to be so limited, but rather only to the extent set forth in the claims that follow.

We claim:

1. A fuel pressure regulator for regulating fuel pressure in a fuel system, said fuel pressure regulator comprising:
    a housing having a housing bore which extends along a housing bore axis, said housing also having a housing inlet which allows fuel into said housing bore;
    a piston located within said housing bore such that said piston and said housing bore define an accumulation chamber and such that said piston slides along said housing bore axis between 1) a first piston position in which said accumulation chamber is minimized in volume and 2) a second piston position in which said accumulation chamber is maximized in volume, said piston having a piston bore extending therethrough from a piston inlet to a piston outlet such that a valve seat is defined between said piston inlet and said piston outlet, such that said piston inlet allows fuel into said piston bore from said housing inlet, and such that said piston outlet provides a path out of said fuel pressure regulator from said piston bore;
    a piston spring which biases said piston toward said first piston position;
    a valve closure within said piston bore which moves between 1) a seated position such that said valve closure mates with said valve seat, thereby preventing fluid communication from said piston inlet to said piston outlet and 2) an unseated position such that said valve closure is separated from said valve seat, thereby providing fluid communication from said piston inlet to said piston outlet; and
    a valve closure spring which biases said valve closure toward said seated position;
    wherein said housing bore defines a housing bore inner peripheral surface which surrounds and faces toward said housing bore axis; and
    wherein said piston defines a piston outer peripheral surface which faces toward said housing bore inner peripheral surface and is sealed to said housing bore inner peripheral surface such that fuel is prevented from passing out of said fuel pressure regulator from radially between said housing bore inner peripheral surface and said piston outer peripheral surface.

2. A fuel pressure regulator as in claim 1, wherein said piston bore is centered about and extends along said housing bore axis.

3. A fuel pressure regulator as in claim 1, wherein said accumulation chamber is defined radially between said housing bore inner peripheral surface and said piston outer peripheral surface.

4. A fuel pressure regulator as in claim 1, wherein said piston includes a seal groove extending radially thereinto such that said seal groove is centered about said housing bore axis and said fuel pressure regulator further comprises a sealing ring within said seal groove which sealingly mates with said housing bore and said seal groove, thereby sealing said housing bore inner peripheral surface and is sealed to said housing bore inner peripheral surface.

5. A fuel pressure regulator as in claim 1, wherein said valve closure spring is grounded to said piston.

6. A fuel pressure regulator as in claim 5, further comprising a valve closure spring retainer within said piston bore which grounds said valve closure spring to said piston.

7. A fuel pressure regulator as in claim 6, wherein said valve closure spring retainer includes a passage therethrough which provides fluid communication from said valve seat to said piston outlet.

8. A fuel pressure regulator as in claim 1, wherein said piston spring is grounded to said housing.

9. A fuel pressure regulator as in claim 8, wherein said piston includes a piston flange extending radially outward therefrom upon which said piston spring biases said piston toward said first piston position.

10. A fuel pressure regulator as in claim 1, wherein said piston moves from said first piston position to said second piston position when fuel pressure at said housing inlet is greater than or equal to a first predetermined pressure and said piston moves from said second piston position to said first piston position when fuel pressure at said housing inlet is less that said first predetermined pressure.

11. A fuel pressure regulator as in claim 10 wherein said valve closure moves from said seated position to said unseated position when fuel pressure at said housing inlet is greater than or equal to a second predetermined pressure which is greater than said first predetermined pressure and said valve closure moves from said unseated position to said seated position when fuel pressure at said housing inlet is less than said second predetermined pressure.

12. A fuel pressure regulator for regulating fuel pressure in a fuel system, said fuel pressure regulator comprising:
- a housing having a housing bore which extends along a housing bore axis, said housing also having a housing inlet which allows fuel into said housing bore;
- a piston located within said housing bore such that said piston and said housing bore define an accumulation chamber and such that said piston slides along said housing bore axis between 1) a first piston position in which said accumulation chamber is minimized in volume and 2) a second piston position in which said accumulation chamber is maximized in volume, said piston having a piston bore extending therethrough from a piston inlet to a piston outlet such that a valve seat is defined between said piston inlet and said piston outlet, such that said piston inlet allows fuel into said piston bore from said housing inlet, and such that said piston outlet provides a path out of said fuel pressure regulator from said piston bore;
- a piston spring which biases said piston toward said first piston position;
- a valve closure within said piston bore which moves between 1) a seated position such that said valve closure mates with said valve seat, thereby preventing fluid communication from said piston inlet to said piston outlet and 2) an unseated position such that said valve closure is separated from said valve seat, thereby providing fluid communication from said piston inlet to said piston outlet; and
- a valve closure spring which biases said valve closure toward said seated position;
- wherein said piston spring is grounded to said housing;
- wherein said piston includes a piston flange extending radially outward therefrom upon which said piston spring biases said piston toward said first piston position;
- and wherein said housing bore is stepped, thereby defining a housing bore shoulder which faces toward said piston flange such that said piston flange abuts said housing bore shoulder when said piston is in said first piston position, thereby limiting travel of said piston.

13. A fuel pressure regulator for regulating fuel pressure in a fuel system, said fuel pressure regulator comprising:
- a housing having a housing bore which extends along a housing bore axis, said housing also having a housing inlet which allows fuel into said housing bore;
- a piston located within said housing bore such that said piston and said housing bore define an accumulation chamber and such that said piston slides along said housing bore axis between 1) a first piston position in which said accumulation chamber is minimized in volume and 2) a second piston position in which said accumulation chamber is maximized in volume, said piston having a piston bore extending therethrough from a piston inlet to a piston outlet such that a valve seat is defined between said piston inlet and said piston outlet, such that said piston inlet allows fuel into said piston bore from said housing inlet, and such that said piston outlet provides a path out of said fuel pressure regulator from said piston bore;
- a piston spring which biases said piston toward said first piston position;
- a valve closure within said piston bore which moves between 1) a seated position such that said valve closure mates with said valve seat, thereby preventing fluid communication from said piston inlet to said piston outlet and 2) an unseated position such that said valve closure is separated from said valve seat, thereby providing fluid communication from said piston inlet to said piston outlet; and
- a valve closure spring which biases said valve closure toward said seated position;
- wherein said piston includes a piston flange extending radially outward therefrom; and
- wherein said housing bore is stepped, thereby defining a housing bore shoulder which faces toward said piston flange such that said piston flange abuts said housing bore shoulder when said piston is in said first piston position, thereby limiting travel of said piston.

* * * * *